United States Patent
Qiu et al.

(10) Patent No.: US 11,900,286 B2
(45) Date of Patent: Feb. 13, 2024

(54) JOB VALUE MODEL GENERATION METHOD AND SYSTEM

(71) Applicant: ServiceTitan, Inc., Glendale, CA (US)

(72) Inventors: Tianyu Qiu, Glendale, CA (US); Navaratnasothie Selvakkumaran, Glendale, CA (US); Miles Gordenker, Glendale, CA (US); Alexander Yakunin, Glendale, CA (US); Vahe Kuzoyan, Glendale, CA (US)

(73) Assignee: SERVICETITAN, INC., Glendale, CA (US)

( * ) Notice: Subject to any disclaimer, the term of this patent is extended or adjusted under 35 U.S.C. 154(b) by 0 days.

(21) Appl. No.: 16/853,509

(22) Filed: Apr. 20, 2020

(65) Prior Publication Data

US 2020/0334616 A1  Oct. 22, 2020

Related U.S. Application Data (60) Provisional application No. 62/836,485, filed on Apr. 19, 2019.

(51) Int. Cl.
G06Q 10/00 (2023.01)
G06Q 10/0631 (2023.01)
G06F 40/40 (2020.01)
G06N 20/00 (2019.01)

(52) U.S. Cl.
CPC ..... *G06Q 10/063118* (2013.01); *G06F 40/40* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 10,453,103 B2* | 10/2019 | Miller | G06Q 30/0283 |
| 10,817,757 B2* | 10/2020 | Sainani | G06F 18/217 |
| 10,847,136 B2* | 11/2020 | Kneller | G06N 5/047 |
| 10,867,328 B2* | 12/2020 | Rattner | G06Q 30/0611 |
| 11,392,844 B1* | 7/2022 | Rao | G06N 20/00 |
| 2014/0279167 A1* | 9/2014 | Miller | G06Q 30/0611 705/26.4 |

(Continued)

OTHER PUBLICATIONS

Lang, Sebastian, Integration of Deep Reinforcement Learning and Discrete-Event Simulation for Real-Time Scheduling of a Flexible Job Shop Production, Winter 2020, IEEE Explore, https://ieeexplore.ieee.org/abstract/document/9383997, p. 1-12. (Year: 2020).*

*Primary Examiner* — Joseph M Waesco
(74) *Attorney, Agent, or Firm* — BakerHostetler (57) ABSTRACT

Systems, methods, and computer program products for generating job value predictions by a trained model for a tenant include receiving live data associated with a tenant, where the live data includes information associated with a job to be performed by the tenant. A trained model associated with the tenant is retrieved, where the trained model is configured to generate a job value prediction for the job to be performed. The live data is preprocessed to obtain a set of features associated with the job, the set of features consumable by the trained model, and the trained model is applied to the set of features to generate the job value prediction for the job to be performed by the tenant.

18 Claims, 4 Drawing Sheets

(56) References Cited

U.S. PATENT DOCUMENTS

| | | | |
|---|---|---|---|
| 2015/0379072 A1* | 12/2015 | Dirac | G06N 20/00 |
| | | | 707/693 |
| 2016/0034809 A1* | 2/2016 | Trenholm | G06F 18/00 |
| | | | 706/20 |
| 2017/0098161 A1* | 4/2017 | Ellenbogen | G06V 10/454 |
| 2017/0124464 A1* | 5/2017 | Crabtree | G06F 9/46 |
| 2017/0124487 A1* | 5/2017 | Szeto | G06F 11/1448 |
| 2018/0322417 A1* | 11/2018 | Bendre | H04L 67/60 |
| 2019/0026663 A1* | 1/2019 | Homeyer | G06Q 10/0633 |
| 2019/0034767 A1* | 1/2019 | Sainani | G06V 40/1347 |
| 2019/0043201 A1* | 2/2019 | Strong | G06V 10/96 |
| 2019/0244267 A1* | 8/2019 | Rattner | G06N 20/00 |
| 2019/0333155 A1* | 10/2019 | Natesan Ramamurthy | |
| | | | G06N 20/00 |
| 2020/0082810 A1* | 3/2020 | Kneller | G06N 5/047 |
| 2020/0097597 A1* | 3/2020 | Lourentzou | G06N 5/022 |
| 2020/0104401 A1* | 4/2020 | Burnett | G06F 16/287 |
| 2020/0166921 A1* | 5/2020 | Lavid Ben Lulu | |
| | | | G05B 23/0283 |
| 2020/0184792 A1* | 6/2020 | Pourmohammad | G06N 5/022 |
| 2020/0218800 A1* | 7/2020 | Sun | G06F 21/552 |
| 2020/0250587 A1* | 8/2020 | Aerni | G06N 5/043 |
| 2020/0303060 A1* | 9/2020 | Haemel | G06N 3/082 |
| 2022/0360642 A1* | 11/2022 | Rogynskyy | G06F 16/2228 |

\* cited by examiner

JOB VALUE MODEL GENERATION METHOD AND SYSTEM

CROSS-REFERENCES TO RELATED APPLICATIONS

This application claims the benefit of and priority to U.S. Provisional Application 62/836,485, filed on Apr. 19, 2019, which is incorporated by reference herein in its entirety and for all purposes.

FIELD

The present invention relates to customized models for predicting a value of a service.

BACKGROUND

Technicians deployed to particular jobs generate revenue from performing work at the job. The revenue generated from deploying a technician to a particular job is often unknown until the technician arrives at the job location. As a result, deployment patterns and other job assignment tasks may be performed inefficiently.

It is with these observations in mind, among others, that aspects of the present disclosure were concerned and developed.

SUMMARY

Embodiments of the present invention generally relate to systems and methods for predicting a value of a job to be performed by a service provider.

In some examples, a method for predicting the value of a job is provided. The method includes receiving live data associated with a tenant, the live data comprising information associated with a job to be performed by the tenant. A trained model associated with the tenant is retrieved the trained model is configured to generate a job value prediction for the job to be performed. The live data is preprocessed to obtain a set of features associated with the job, the set of features consumable by the trained model; and the trained model is applied to the set of features to generate the job value prediction for the job to be performed by the tenant.

In some examples, a system is provided. The system comprises one or more processors; and a non-transitory computer-readable storage medium containing instructions which, when executed on the one or more processors, cause the one or more processors to perform operations including: receiving live data associated with a tenant, the live data comprising information associated with a job to be performed by the tenant; retrieving a trained model associated with the tenant, wherein the trained model is configured to generate a job value prediction for the job to be performed; preprocessing the live data to obtain a set of features associated with the job, the set of features consumable by the trained model; and applying the trained model to the set of features to generate the job value prediction for the job to be performed by the tenant.

In some examples, a non-transitory machine-readable storage medium is provided, including instructions configured to cause a data processing apparatus to perform operations including: receiving live data associated with a tenant, the live data comprising information associated with a job to be performed by the tenant; retrieving a trained model associated with the tenant, wherein the trained model is configured to generate a job value prediction for the job to be performed; preprocessing the live data to obtain a set of features associated with the job, the set of features consumable by the trained model; and applying the trained model to the set of features to generate the job value prediction for the job to be performed by the tenant.

In some examples, preprocessing the live data comprises applying one or more encoding techniques associated with the tenant to the live data.

In some examples, preprocessing the live data comprises applying one or more natural language processing (NLP) techniques to the live data.

In some examples, preprocessing the live data comprises applying one or more natural dimensionality reduction techniques to the live data.

In some examples, the model is a regression model and the job value prediction for the job is a real number.

In some examples, the live data comprises one or more of an associated marketing campaign identification, a business unit identification, a job type identification, a job priority value, a call direction value, a call date value, a call script field, a job zip code field, a job latitude value, a job longitude value, a customer balance value, a customer credit card count, a customer bank account count, a customer invoice total value, a weather field, or a questionnaire data field, wherein the questionnaire data field is designed at least in part by the tenant.

Some examples further comprise training a machine learning model to generate the trained model, wherein training the machine learning model comprises: receiving a historical dataset associated with the tenant, the historical dataset comprising a historical record of features associated with the job; generating a training dataset and a testing dataset from the historical dataset; training the machine learning model using the training dataset; and testing and updating the machine learning model using the testing dataset.

In some examples, the historical record of features associated with the job comprises one or more of a job value total, job revenue, or profits for the job performed by the tenant or one or more other tenants over a period of time.

Some examples further comprise retraining the machine learning model on a regular scheduled basis.

A method for generating a job value prediction (JVP) includes receiving live data associated with a tenant, the live data including information associated with a job to be performed by the tenant, retrieving a trained model associated with the tenant, wherein the trained model is configured to generate a JVP based on feature inputs and the JVP includes a predicted value of the job to be performed, encoding the live data with a tenant encoder to generate feature data consumable by the trained model, wherein the tenant encoder is configured to perform one or more data preprocessing techniques associated with the tenant, providing the feature data to the trained model, and generating the JVP for the tenant based on the feature data.

In some examples, the model is trained by receiving a historical dataset associated with the tenant, the historical dataset including historical feature inputs and associated historical target values, and training the model using the historical dataset. In some further examples, each historical target value includes a job value total based on a total amount paid for completing an associated job.

In some examples, the disclosed methods, systems, and computer program products also include receiving a job value total associated with the live data, storing the job value total and the live data as historical data, and retraining the model with the historical data, wherein at least a portion of the historical data comprises the stored job value total and live data. In some further examples, retraining the model reoccurs on a regular scheduled basis.

BRIEF DESCRIPTION OF THE DRAWINGS

The description will be more fully understood with reference to the following figures, which are presented as various embodiments of the disclosure and should not be construed as a complete recitation of the scope of the disclosure, wherein.

DETAILED DESCRIPTION

Aspects of the present disclosure involve systems, methods, computer program products, and the like, for generating a model configured to predict a value of a job to be performed by a particular service provider. For example, the model can be provided with input data to generate a job value prediction (JVP) for downstream services associated with the service provider. In some examples, the generated model can be updated (e.g., on a scheduled basis, or using feedback from completed jobs).

Generating the model for the particular service provider may include obtaining one or more features to generate and train a linear regression model for predicting a job value (also referred to as generating a JVP). For example, the features may include, as explanatory examples and without imputing limitation, job type, business unit, text description, zip code, building age, and customer demographic information, among others. Each model may be associated with a particular service provider (e.g., a company), sometimes referred to as a tenant. Further, each tenant may be organized according to business units denoting a particular respective specialization in activities such as installation, repair, etc. In some examples, a model for job value prediction may be associated with two or more tenants. For example, the model may be used for predicting job values for two or more tenants and/or the model may be trained using data obtained from multiple tenants.

In some examples, the JVP can represent a prediction of a spending potential of a customer (e.g., the spending potential of the customer with respect to a tenant associated with the model). In some examples, the JVP can be generated or updated when the customer makes contact with the tenant to request service associated with a job. In some examples, generating the model can include training the model using a training dataset which includes historical information associated with past jobs. For example, the training dataset can include a historical record of features associated with a job, where the features can include one or more of job revenue, profits, and/or other features. In some examples, the historical record may extend over a period of time (e.g., a three month window preceding a current date, or a period of time corresponding to a prior season, previous year, etc.). Based on the historical record, the model can be trained to generate a JVP based on the training dataset which includes the features. The JVP may be substantially similar to a respective direct or indirect job valuation value such as job revenue or profits, or a derived value based on, for example and without imputing limitation, revenue and/or profits.

In some examples, the features used for training the model can also include, by way of explanatory examples and without imputing limitation, one or more of: marketing campaign identification, business unit identification, job type identification, job priority, job total, call direction, call date, call script, job zip code, job latitude and longitude, customer balance, customer credit card count, customer bank account count, customer invoice total, weather, and additional questionnaire data designed by the tenant and provided to the customer (e.g., during a call to request service). The questionnaire data can include specifications and number of problematic equipment, affected areas, length of the problem, etc.

In particular, marketing campaign identification may be a tenant assigned number of a marketing campaign that resulted in the associated customer call; business unit identification may be a tenant assigned identifier of a unit that handles the job; job type identification may be a tenant assigned identifier of a job type; job priority may be a rating of job urgency (e.g., a 0 to 4 scale, etc.); job total may include a value of how much the associated customer spent on the job; call direction may indicate whether the call for the job was initiated by the customer or the tenant; call date may include a time and date of the call; call script may include a natural language text describing the customer requests and/or complaints; zip code, latitude, and longitude can provide detailed geographical information for the job; customer balance may include how much the customer owes the tenant for previous jobs; customer credit card count may denote a number of different credit cards the customer has used with the tenant; customer bank account count may denote the number of different bank accounts the customer has paid bills to the tenant with; customer invoice total may denote the total amount of historical spending by the customer with the tenant; and weather may include temperature, humidity, wind speed, and/or precipitation intensity within a time frame (e.g., past three days, etc.) of the call. Further, natural language processing (NLP) techniques may be applied to natural language text data (e.g., call script, additional questionnaires, etc.) to prepare natural language data for use by the model. For example, and without imputing limitation, text can be vectorized as one-hot encodings or according to a dictionary of latent embeddings (e.g., via a semantic space, etc.). In some examples, only key words may be identified and prepared for use by the model.

In some examples, the features can be processed or preprocessed to generate preprocessed feature data, where the preprocessed feature data is provided to the model. The preprocessing of the features is also referred to as feature engineering. Feature engineering can include the NLP techniques as described above, or applying other types of processing functions which present the features in a form which can be used or consumed by the model. The processed features can be used for training the model and/or for generating predictions (e.g., JVP) using the trained model. For example, and without imputing limitation, feature engineering can include applying one-hot encoding to the business unit identification and job type identification, where one-hot encoding refers to computational techniques using binary arithmetic (e.g., bits of value 0 or 1) among which the only allowed combinations of values for groups of bits include a single high (1) bit and all the others low (0). In some examples, label encoding can be applied to questionnaire answers of string type and categorical features can be enhanced with respective target mean encoded values. In some examples, feature engineering can include applying dimensionality reduction techniques (e.g., clustering, principle component analysis (PCA), etc.) to obtain a reduced feature set from the available features, where using the reduced feature set in the model can lead to computational efficiencies.

As previously noted, the model can include a regression model (e.g., linear regression) applied to the features for training and prediction. The regression model can generate the JVP as a real number using the features (e.g., the preprocessed feature data where feature engineering is applied before providing the features to the model). In some variations, a classifier model may be used as an alternative to the regression model. Using the classifier model can result in a categorical JVP (e.g., a value range) being generated, rather than the real number which may be obtained by using the regression model. In some implementations, the model used for generating the JVP can be based on specifications for the output type or model type. For example, the regression model can be used where a classifier model a categorical value for the JVP may be excluded according to the specification. In other examples, various other models may be used to generate the JVP such as, for example and without imputing limitation, neural networks, Bayesian networks, support vector machines (SVMs), boosted decision trees, bagged decision trees, or combination of models such as an ensemble network or the like.

In some examples, a historical dataset or record which includes features associated with earlier completed jobs can be stored for use by the model. The historical dataset can include a job total value for a job, among other features. The historical dataset can be apportioned into a training subset and a testing subset (e.g., at an approximate respective ratio of 8:2). The job total value for each of a set of features used in the model can be treated as a target value by the model. The JVP generated by the model is treated as a predicted value. The predicted value can be compared with the target value. The model can be trained and tested with an objective of matching the predicted value and the target value during training and testing phases for the model. Training the regression model may include iteratively building decision trees based on the training subset in order to minimize a difference between the predicted values and the target values (e.g., between a JVP and a job total value). Additionally, cross-validation may be used to optimize model parameters. Upon achieving a threshold accuracy during testing the model against the testing subset, the trained model can be stored in a data repository (e.g., database, etc.) to facilitate later retrieval for generating JVPs in a live environment.

In the live environment, when a customer calls a tenant (e.g., service provider or company, etc.), a JVP system may receive a request associated with the tenant to generate a JVP based on associated live data. The live data can include information from which the features for generating the JVP can be obtained. The live data can be obtained from the customer at any point in time, including during the request call itself, through a follow on communication, or other. The JVP system can process the live data to obtain the features. For example, processing the live data can include applying encoding processes, NLP techniques, or others for converting the live data into features associated with the tenant. The encoding processes, NLP techniques, etc., can be applied using information previously stored and retrievable from a storage repository, as previously explained. The features obtained from processing the live data may then be fed to a trained model associated with the tenant (e.g., the trained model can be retrieved from a storage repository for storing the trained models associated with the tenant). The trained model may generate a JVP from the features (e.g., obtained from the ingested live data upon processing). The JVP can be provided to the service provider or tenant. In some examples, the JVP can be provided to downstream services (e.g., for use in scheduling processes for future services provided by the same service provider or other service providers). In some examples, the JVP can be provided for use by multiple recipients, e.g., to multiple tenants, including the tenant from which the live data was gathered, as well as other tenants who may subscribe to the JVP. In some examples, where the model fails to return or make a prediction, the JVP system may instead return an average (e.g., median, mean, etc.) value for the job based on recent predictions of the same job type. In some examples, the recent predictions may include predictions made for the same tenant, while in other examples, the recent predictions may include predictions made for multiple tenants.

Further, trained models may be updated or retrained on a periodic basis (e.g., nightly, weekly, etc.) to ensure JVPs accurately reflect shifts in the market. Live data may be recorded and updated with job total values following completion of the job. The updated recorded data can then be apportioned similarly as described above (e.g., 8:2 of training data to testing data) and provided to the model through a model training process. As a result, each tenant model can keep up with, for example and without imputing limitation, changes in respective campaign identifications, business unit identifications, job type identification, and/or job total values. In effect, the accuracy of the JVP is less susceptible to deterioration over time after initial model training. Further, the JVP may adjust to periodic changes, such as seasonal changes and the like.

As depicted in the figures below, the JVP can be generated by a system configured for training and using a model as described in detail below. For example, the system may include training, predicting, and updating (e.g., retraining) processes.

Figure 1:
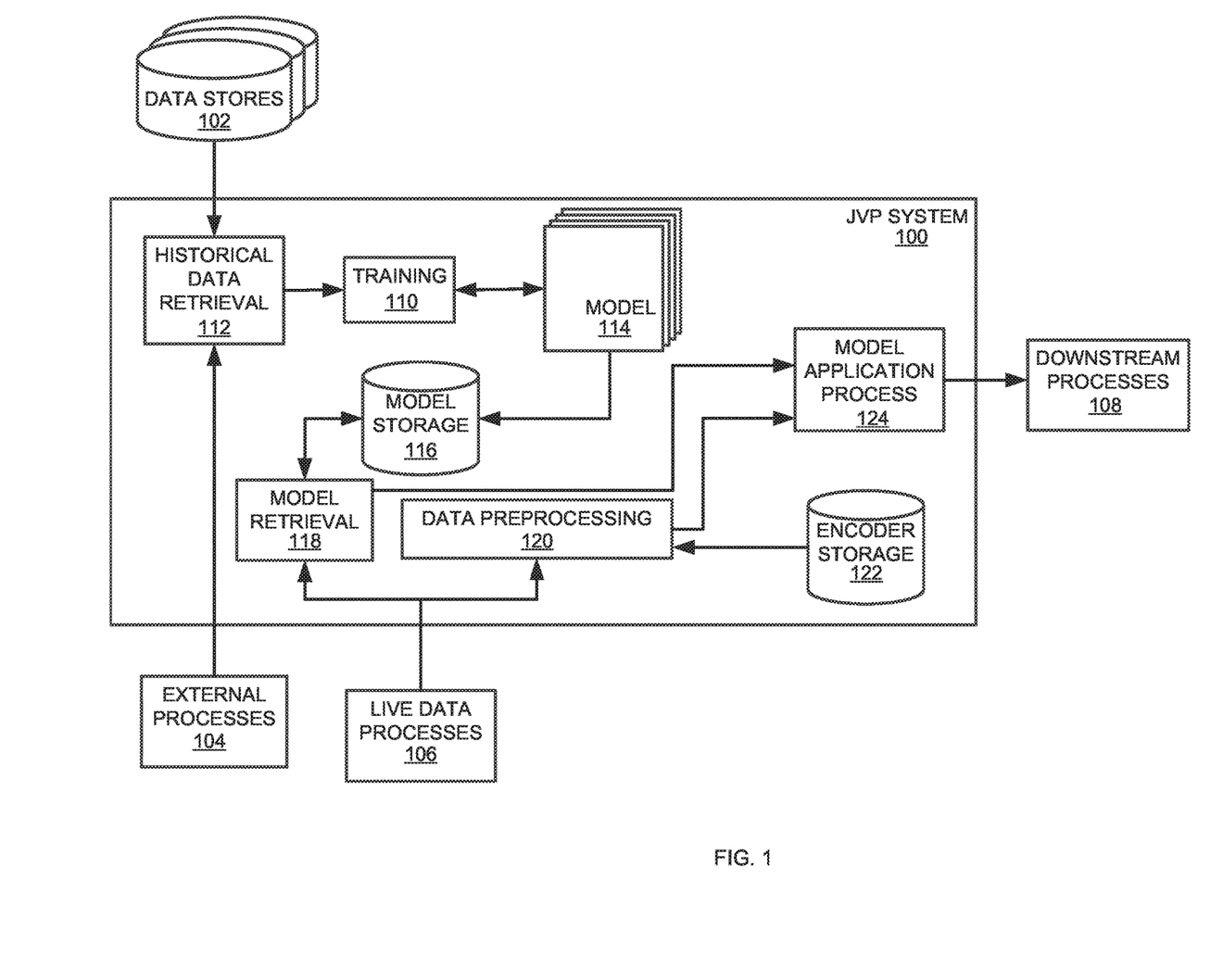
FIG. 1 is a block diagram depicting a job value prediction system in accordance with various embodiments of the subject technology.

FIG. 1 depicts a job value prediction (JVP) system 100 for generating a value prediction for a job based on live data. For example, JVP system 100 may obtain real time information or live data from a job request. The job request can be made to a service provider, tenant, company, or the like. The job request can be received by the tenant in the form of a phone call, electronic communication (e.g., instant or text message, electronic mail, via an application programming interface (API)), in person, or any other medium for obtaining information from a customer about a job request. The job request may include job information such as job type, requesting business unit, location information, customer history (e.g., credit and/or payment data, etc.), and the like. The live data collected from the job request may be processed by JVP system 100 to obtain a set of features associated with the job. The set of features can be used by a trained model associated with the tenant. The trained model may have been trained using historical data accessible by JVP system 100, where the historical data may pertain to the tenant receiving the job request or based on data collected from multiple tenants. The trained model may then be used to generate a predicted job value or JVP. The JVP can be used by the tenant to provide an estimate to the customer or requester who originated the job request. The JVP can also be used for downstream services such as for scheduling future jobs, updating the trained model, etc.

As shown in FIG. 1, JVP system 100 may include various functional blocks for performing the functions described herein. For example, JVP system 100 can interface with data stores 102, external processes 104, live data processes 106, and downstream processes 108. For example, data stores 102 can include the historical record of features associated with the tenant, including features specific to the job request (e.g., job revenue, profits, job totals and/or other features over a period of time, which may be used as a target value for training a model with which to gauge performance of the trained model as it undergoes training and testing iterations.). External processes 104 can include processes implemented outside JVP system 100 for obtaining historical data relevant to the job. Historical data retrieval 112 can include processes for retrieving historical records pertaining to the job request using data stores 102 and external processes 104. The historical data retrieved from historical data retrieval 112 can be provided to training 110. Training 110 can include processes for preparing the received historical data for use as training and test datasets (or subsets). The training datasets can be used for training a model 114 and the testing datasets can be used for testing the model 114 which has been trained.

For example, training 110 can receive historical data associated with a particular company, or tenant from historical data retrieval 112. Training 110 can divide the received historical data into a training dataset and a testing dataset. In some examples, model 114 can generate job total predictions using the training dataset, where the job total predictions can be used as a predicted value, and the testing dataset can be used to obtain target values, as described previously.

Training of model 114 may be complete when the predicted value and the target value may start to converge, or based on other criteria used for determining when model 114 can be considered to be trained. Once training of model 114 is complete, JVP system 100 stores model 114 in a model storage 116 for later retrieval and use with live data. Model storage 116 may be a local data store, a remote data store, a distributed database or some combination of the above. Model storage 116 can store model 114 in association with a respective tenant (e.g., the tenant corresponding to the historical data retrieved). Model storage 116 may be accessed by model retrieval 118 to retrieve a particular model 114. For example, the particular model 114 may be retrieved for predicting JVPs using live data obtained from live data processes 106 and/or for retraining. The retraining of model 114 can be performed according to a schedule, or based on triggering events such as generation of a new JVP.

For example, model retrieval 118 can retrieve an appropriate model 114 from model storage 116 based on a request from a live data process 106 for a JVP. Live data processes 106 may include processes for gathering live data, for example from a job request. Live data processes 106 can also include services such as monitoring, management, administration, etc., for managing technician deployments and/or service provisioning by a company (e.g., tenant).

As illustrated, data preprocessing 120 can implement preprocessing or data engineering on live data obtained from live data processes 106. For example, data preprocessing 120 can apply encoding (e.g., one-hot encoding), NLP, or other preprocessing on the live data. The encoding can be based on encoders obtained from an encoder storage 122. For example, data preprocessing 120 may apply encoding techniques using encoders obtained from encoder storage 122 to, as an example, convert job unit identifications into an appropriate one-hot vectors for model 114 to process. In some examples, data preprocessing 120 may perform NLP techniques to identify and vectorize natural language text included within the live data.

Model application process 124 can receive the preprocessed data from data preprocessing 120 and the trained model from model 114. The preprocessed data can be applied to the trained model by model application process 124 to generate a JVP. The generated JVP may be an output of JVP system 100. The JVP can be provided as an estimate to the customer requesting a job or from whom live data may have been obtained in the live data processes 106. In some examples, the JVP can be provided to downstream processes 108 to, for example and without imputing limitation, perform scheduling and assignment tasks for technicians, etc. In some examples, where model application process 124 is unable to produce a JVP by model 114 within a certain period of time, such as due to an outage or the like, a JVP may be generated instead by a substitute process, such as an aggregating and averaging process (not depicted) which generates a JVP or other substitute prediction/estimate based on a statistic (e.g., average, mean, median, or other) of job values of a recent window of similar job receipts.

Figure 2:
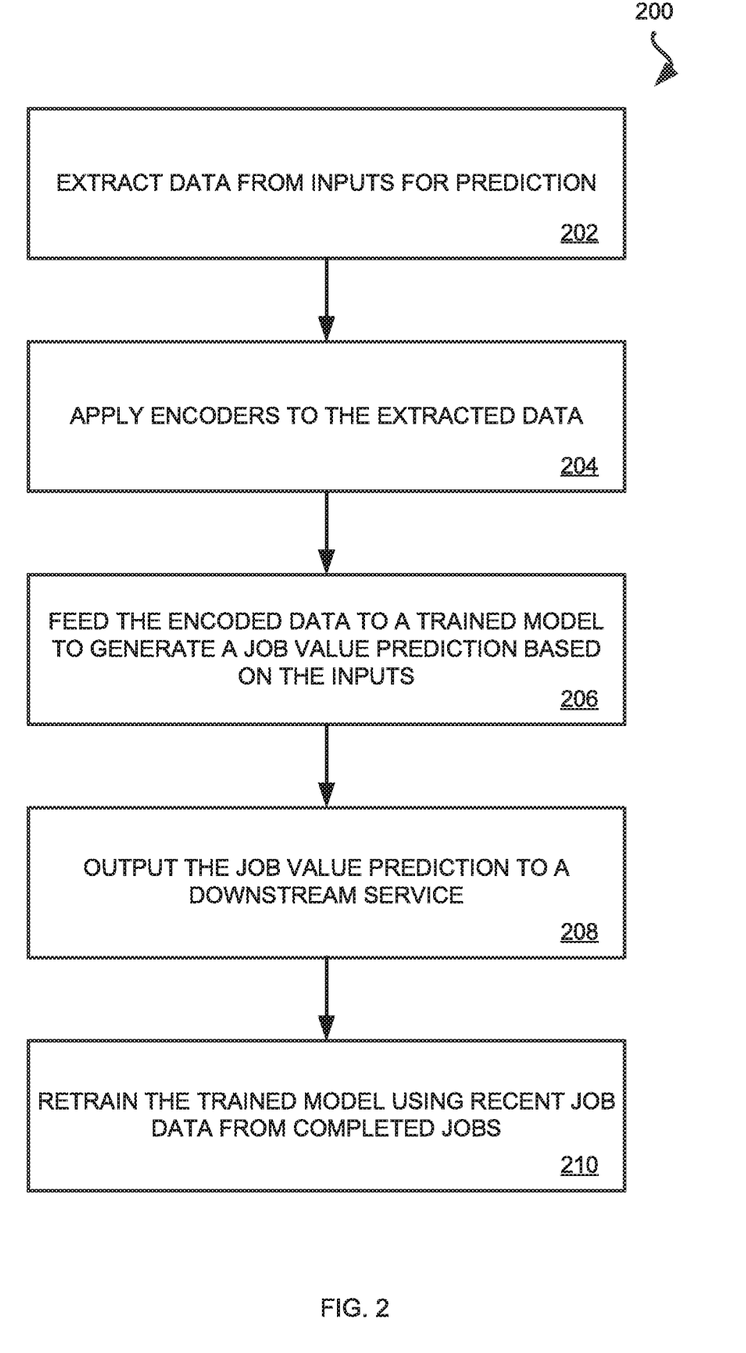
FIG. 2 is a flowchart depicting a method for generating a job value prediction in accordance with various embodiments of the subject technology.

FIG. 2 is a flowchart diagram of a method 200 for generating a JVP and maintaining a trained model. For example, method 200 may be performed by a system substantially similar to JVP system 100. In particular, method 200 applies a trained model to live data to generate a JVP, e.g., in a live environment.

At step 202, data is extracted from inputs for prediction. The inputs may include live data. For example, extracting the data from the inputs can include receiving live data associated with a tenant, the live data including information associated with a job to be performed by the tenant. The live data or inputs can be provided by, for example and without imputing limitation, a mobile device, computer, smartphone, in person, over a phone call, etc. The inputs may be provided using an API, monitoring utility, etc. The live data can include one or more of an associated marketing campaign identification, a business unit identification, a job type identification, a job priority value, a call direction value, a call date value, a call script field, a job zip code field, a job latitude value, a job longitude value, a customer balance value, a customer credit card count, a customer bank account count, a customer invoice total value, a weather field, or a questionnaire data field, wherein the questionnaire data field is designed at least in part by the tenant.

At step 204, preprocessing can be performed on the extracted data. For example, preprocessing the live data can lead to generating a set of features associated with the job, the set of features consumable by the trained model. In some examples, preprocessing the live data can include applying one or more encoding techniques associated with the tenant to the live data. In some examples, preprocessing the live data can include applying one or more natural language processing (NLP) techniques to the live data. In some examples, preprocessing the live data can include applying one or more natural dimensionality reduction techniques to the live data. For example, encoders associated with the tenant can be applied to the extracted data, NLP can be performed on the extracted data, dimensionality reduction techniques can be applied to the extracted data, or other preprocessing techniques can be applied to the extracted data. Appropriate encoders may be generated during, and as part of, an earlier model training phase for an appropriate model. In some examples, encoders may be stored alongside the trained model (e.g., as part of a larger, stored data structure within a database, etc.). Additionally, further preprocessing of the input data may include NLP tasks or other data engineering techniques, the outputs of which may also be encoded via the applied encoders.

At step 206, the preprocessed and/or encoded data can be provided to a trained model which generates a JVP. For example, the trained model can be applied to the set of features obtained from the live data to generate the job value prediction for the job to be performed by the tenant. In some examples, providing the preprocessed data to the trained model can be based on retrieving a trained model associated with the tenant, where the trained model is configured to generate a job value prediction for the job to be performed. In one example, the trained model is a regression model. In some examples, the trained model may be a classifier. In some examples, other model architectures may be used such as a neural network, SVM, Bayesian, and the like.

At step 208, the JVP is output to a downstream service. For example, the JVP may be returned directly back to the requesting service (e.g., as a response to a manual JVP request). In some examples, the JVP is provided downstream to task scheduling and assignment services. Further, in some examples, the JVP and/or the inputs may be stored in a repository for later retrieval, such as during a training phase.

At step 210, the trained model can be retrained using recent job data from completed jobs. Once a job has been completed, the total job value may be calculated and provided, for example, to JVP system 100. Using the stored inputs and the provided total job value, the trained model may be retrained, or updated, according to the real world job value based on any difference between the JVP and the real world job value. Retraining may be scheduled to occur automatically. In one example, a weekly schedule automatically retrains stored models based on real world job value data from the preceding week.

In some examples, training the model can include training a machine learning model to generate the trained model, where training the machine learning model comprises receiving a historical dataset associated with the tenant, the historical dataset comprising a historical record of features associated with the job; generating a training dataset and a testing dataset from the historical dataset; training the machine learning model using the training dataset; and testing and updating the machine learning model using the testing dataset. The historical record of features associated with the job can include one or more of a job value total, job revenue, or profits for the job performed by the tenant or one or more other tenants over a period of time. The machine learning model can be retrained on a regular scheduled basis.

Figure 3:
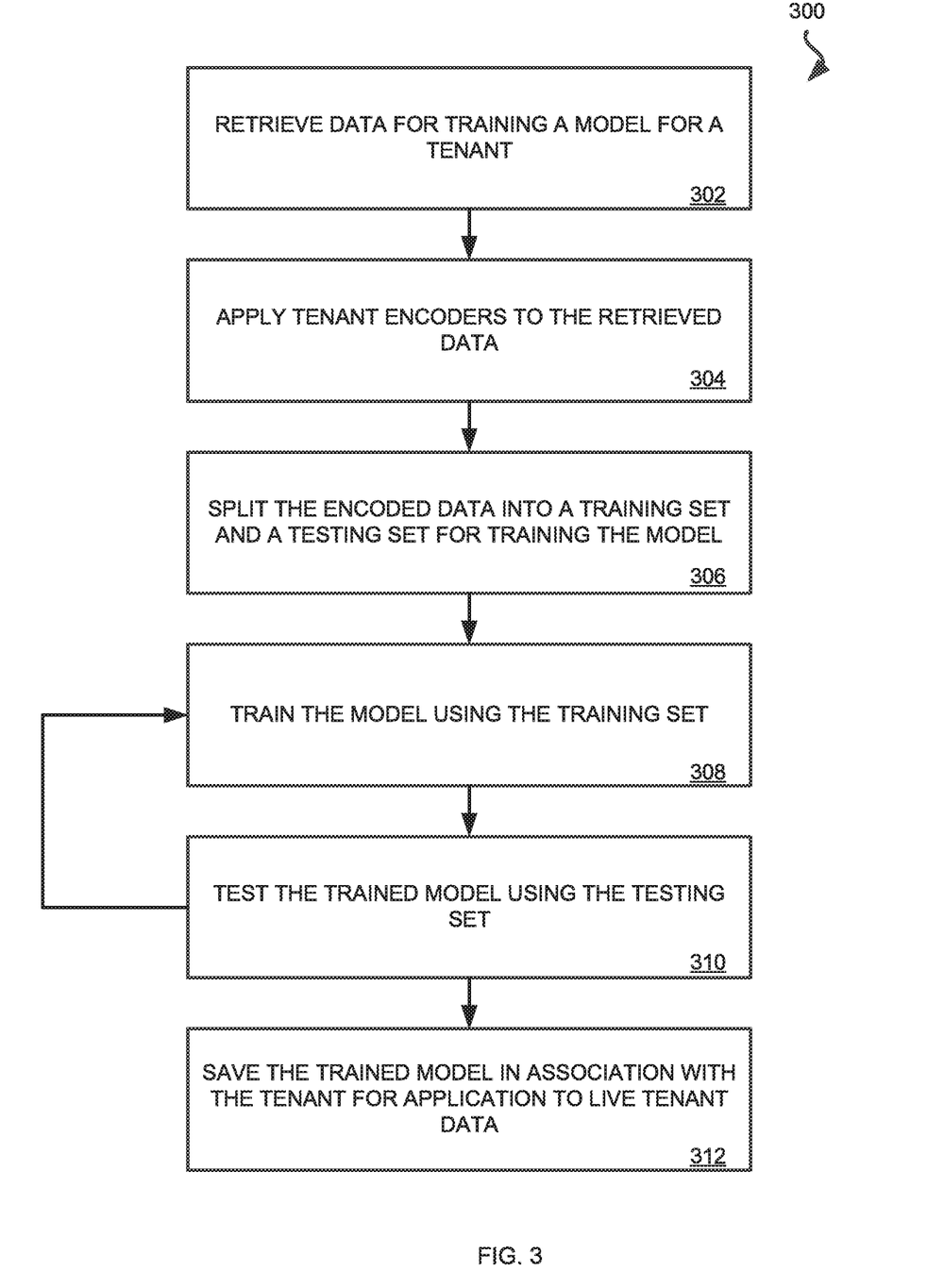
FIG. 3 is a flowchart depicting a method for training a model in accordance with various embodiments of the subject technology.

FIG. 3 depicts a method 300 for training a model, such as model 114 discussed above. In some examples, a system substantially similar to system 100 may perform method 300 to prepare trained models for use in predicting JVPs and the like.

At step 302, data is retrieved for training a model for a particular tenant. In general, a tenant may be associated with a particular company or user. Further, the retrieved data may be obtained directly from the tenant or be obtained from a record of historical data saved on an accessible data store and associated with the tenant. The retrieved data includes, directly or indirectly, at least one value type (e.g., total job value, etc.) which may be used as a target value against which to determine a model accuracy.

At step 304, tenant encoders are applied to the retrieved data. The encoders prepare the data for ingestion by the model. The tenant encoders may be provided by the tenant or accessed via a encoder store and associated with the tenant. In some examples, the retrieved data may be stored in an encoded state and retrieved as already encoded data ready to be consumed by a model.

At step 306, the encoded data is divided into a training set and a testing set for training the model. As discussed above, in one example, the training set and testing set are divided along an 8:2 ratio. Generally, where the sets are derived from a single retrieved dataset, the training set and testing set are substantially similar types and configurations of data.

At step 308, the model is trained use the training set. In one example, the model receives (e.g., is fed) a collection of associated features as input and outputs a predicted value through an assortment of functions contained within the model. The predicted value is compared to an associated target value (e.g., total job value, etc.) to determine an accuracy. Based on the accuracy (e.g., similarity of the predicted value to the associated target value), the internal functions of the model may be updated accordingly. In some examples, training includes generating predicted values and updating internal functions repeatedly over batches of training data until an accuracy threshold is achieved when the model is applied to the training data. The accuracy threshold may be measured as an average accuracy across multiple comparisons between respective predicted values and target values or a single run accuracy based on achieving a target accuracy at a single iteration comparing a predicted value to a target value.

At step 310, the trained model is tested with the testing set. In one example, the trained model is fed associated features from the trained dataset and the output predicted value is compared to an associated target value. If a threshold accuracy is not achieved, the trained model repeats the training process of step 310. In some examples, a new training set is generated from either data previously excluded or based on a randomly selected set of training and testing data along the same ratio. As a result, the model can be continuously trained until a target threshold accuracy is achieved in the testing step.

At step 312, having achieved a target accuracy, the trained model is saved (e.g., in model storage 116, etc.) in association with the tenant for application to live data from the same tenant. As a result, the model may be retrieved as needed and applied to new data provided by, or associated with, the tenant such as a new job inquiry and the like. In some examples, the tenant encoders are stored in association with the trained model in order to preprocess the live data before being processed by the trained model. The trained model may then produce a predicted value, or JVP, for live data on an as needed basis.

Figure 4:
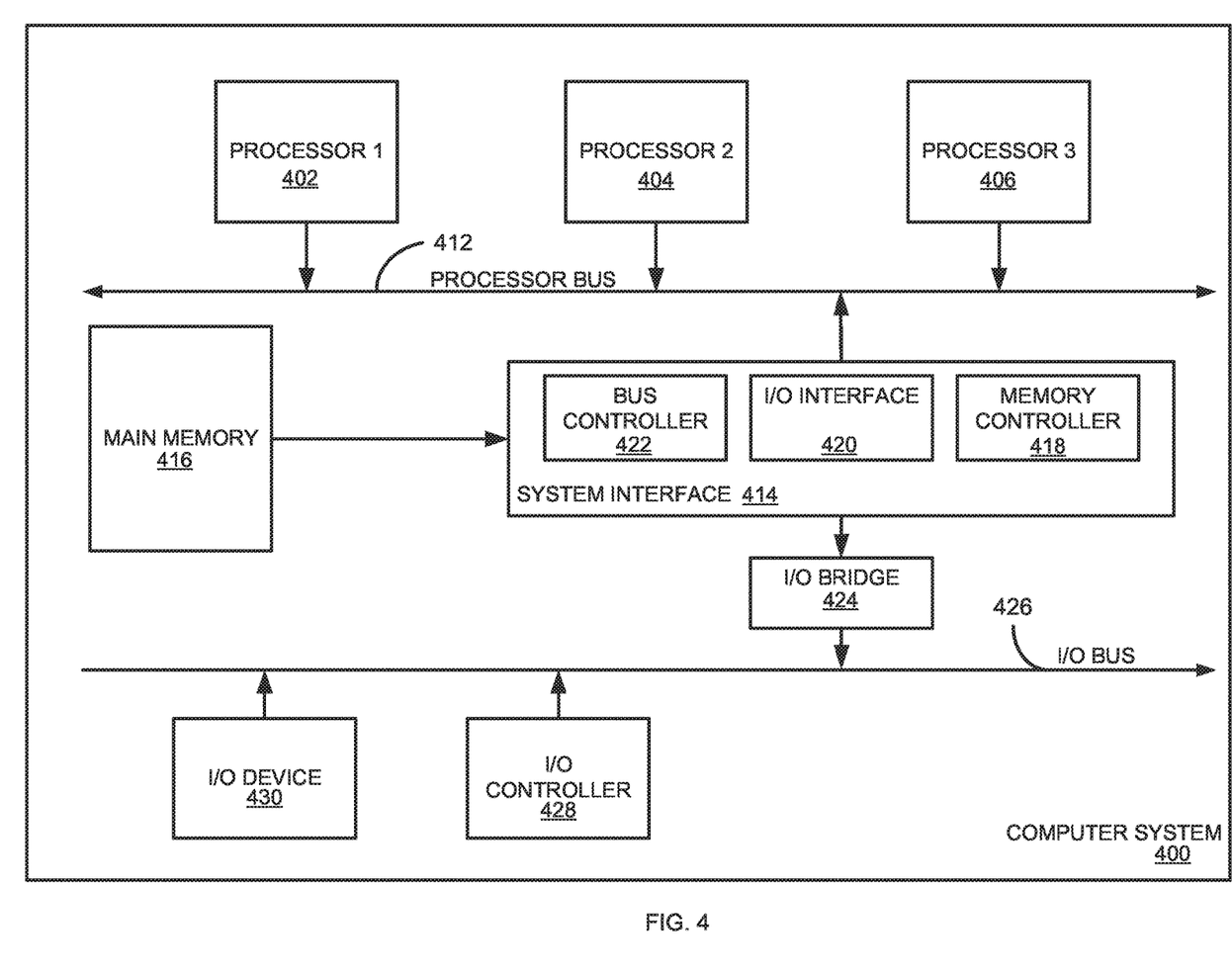
FIG. 4 is a diagram illustrating an example of a computing system which may be used in implementing various embodiments of the present disclosure.

FIG. 4 is a block diagram illustrating an example of a computing device or computer system 400 which may be used in implementing the embodiments of the components of the network disclosed above. For example, the computing system 400 of FIG. 4 may be the provider edge device discussed above. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 414 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 440, as illustrated.

I/O device 440 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method for predicting the value of a job, the method comprising:
   training a machine learning model to generate job value predictions associated with a tenant;
   receiving, based on the tenant receiving a first job request from a first customer, live data associated with the first job request, wherein the first job request comprises a first request that at least one service technician associated with the tenant perform the job at a job location associated with the first customer;
   preprocessing the live data to obtain a set of features associated with the first job request, the set of features consumable by the trained machine learning model;
   applying the trained machine learning model to the set of features to generate a first job value prediction associated with the first job request;
   sending the first generated job value prediction to the tenant;
   updating the trained machine learning model based at least in part on the first generated job value prediction and an actual job value determined based on the at least one service technician completing the job at the job location associated with the first customer;
   receiving, based on the tenant receiving a second job request from a second customer, live data associated with the second request, wherein the second job request comprises a second request that the at least one service technician associated with the tenant perform the job at a job location associated with the second customer; and
   based on the trained machine learning model being unable to generate a second job value prediction associated with the second job request using the live data associated with the second request within a predetermined time window, generating the second job value prediction associated with the second job request based on a statistics associated with job values of other job requests.

2. The method of claim 1, wherein the trained machine learning model is a regression model and the first job value prediction for the job is a real number.

3. The method of claim 1, wherein the live data comprises one or more of an associated marketing campaign identification, a business unit identification, a job type identification, a job priority value, a call direction value, a call date value, a call script field, a job zip code field, a job latitude value, a job longitude value, a customer balance value, a customer credit card count, a customer bank account count, a customer invoice total value, a weather field or a questionnaire data field, wherein the questionnaire data field is designed at least in part by the tenant.

4. The method of claim 1 wherein training the machine learning model comprises:
   receiving a historical dataset associated with the tenant, the historical dataset comprising a historical record of features associated with jobs performed by the tenant or one or more other tenants over a period of time;

generating a training dataset and a testing dataset from the historical dataset;

training the machine learning model using the training dataset; and testing and updating the machine learning model using the testing dataset.

5. The method of claim 4, wherein the historical record of features associated with the jobs performed by the tenant comprises one or more of a job value total, job revenue, or profits for the jobs performed by the tenant or the one or more other tenants over the period of time.

6. The method of claim 1, further comprising retraining the machine learning model on a regular scheduled basis.

7. The method of claim 1, further comprising, after applying the trained machine learning model to the set of features to generate the first job value prediction associated with the first job request:

receiving data associated with the actual job value after the at least one service technician has performed the job for the customer at the job location, wherein updating the trained machine learning model based at least in part on the first generated job value prediction and the actual job value determined based on the at least one service technician completing the job at the job location comprises:

retraining the trained machine learning model based on a difference between the first generated job value prediction and the actual job value.

8. The method of claim 1, wherein the tenant comprises at least one of a service provider or a company, and the at least one service technician is assigned to complete the job at the job location associated with the first customer by the tenant.

9. The method of claim 1, wherein the first job value prediction comprises indicates a spending potential of the customer with respect to the job.

10. The method of claim 1, wherein the job comprises at least one of an installation or a repair.

11. A system, comprising:

one or more processors; and a non-transitory computer-readable storage medium containing instructions which, when executed on the one or more processors, cause the one or more processors to perform operations including:

receiving, based on the tenant receiving a first job request from a first customer, live data associated with the first job request, wherein the first job request comprises a first request that at least one service technician associated with the tenant perform the job at a job location associated with the first customer;

preprocessing the live data to obtain a set of features associated with the first job request, the set of features consumable by the trained machine learning model;

applying the trained machine learning model to the set of features to generate a first job value prediction associated with the first job request;

sending the first generated job value prediction to the tenant;

updating the trained machine learning model based at least in part on the first generated job value prediction and an actual job value determined based on the at least one service technician completing the job at the job location associated with the first customer;

receiving, based on the tenant receiving a second job request from a second customer, live data associated with the second request, wherein the second job request comprises a second request that the at least one service technician associated with the tenant perform the job at a job location associated with the second customer; and based on the trained machine learning model being unable to generate a second job value prediction associated with the second job request using the live data associated with the second request within a predetermined time window, generating the second job value prediction associated with the second job request based on a statistics associated with job values of other job requests.

12. The system of claim 11, wherein the trained machine learning model is a regression model and the first job value prediction for the job is a real number.

13. The system of claim 11, wherein the live data comprises one or more of an associated marketing campaign identification, a business unit identification, a job type identification, a job priority value, a call direction value, a call date value, a call script field, a job zip code field, a job latitude value, a job longitude value, a customer balance value, a customer credit card count, a customer bank account count, a customer invoice total value, a weather field, or a questionnaire data field, wherein the questionnaire data field is designed at least in part by the tenant.

14. The system of claim 11, wherein training the machine learning model comprises:

receiving a historical dataset associated with the tenant, the historical dataset comprising a historical record of features associated with jobs performed by the tenant or one or more other tenants over a period of time;

generating a training dataset and a testing dataset from the historical dataset;

training the machine learning model using the training dataset; and testing and updating the machine learning model using the testing dataset.

15. The system of claim 14, wherein the historical record of features associated with the jobs performed by the tenant comprises one or more of a job value total, job revenue, or profits for the jobs performed by the tenant or the one or more other tenants over the period of time.

16. The system of claim 11, further comprising retraining the machine learning model on a regular scheduled basis.

17. A non-transitory machine-readable storage medium, including instructions configured to cause a data processing apparatus to perform operations including:

training a machine learning model to generate job value predictions associated with a tenant;

receiving, based on the tenant receiving a first job request from a first customer, live data associated with the first job request, wherein the first job request comprises a first request that at least one service technician associated with the tenant perform the job at a job location associated with the first customer;

preprocessing the live data to obtain a set of features associated with the first job request, the set of features consumable by the trained machine learning model;

applying the trained machine learning model to the set of features to generate a first job value prediction associated with the first job request;

sending the first generated job value prediction to the tenant;

updating the trained machine learning model based at least in part on the first generated job value prediction and an actual job value determined based on the at least one service technician completing the job at the job location associated with the first customer;

receiving, based on the tenant receiving a second job request from a second customer, live data associated with the second request, wherein the second job request comprises a second request that the at least one service technician associated with the tenant perform the job at a job location associated with the second customer; and based on the trained machine learning model being unable to generate a second job value prediction associated with the second job request using the live data associated with the second request within a predetermined time window, generating the second job value prediction associated with the second job request based on a statistics associated with job values of other job requests.

18. The non-transitory machine-readable storage medium of claim 17, wherein the live data comprises one or more of an associated marketing campaign identification, a business unit identification, a job type identification, a job priority value, a call direction value, a call date value, a call script field, a job zip code field, a job latitude value, a job longitude value, a customer balance value, a customer credit card count, a customer bank account count, a customer invoice total value, a weather field, or a questionnaire data field, wherein the questionnaire data field is designed at least in part by the tenant.

\* \* \* \* \*